United States Patent [19]

Sheikholeslami et al.

[11] Patent Number: 4,763,046
[45] Date of Patent: Aug. 9, 1988

[54] CRT PROTECTION CIRCUIT

[75] Inventors: Amir M. Sheikholeslami, Arlington Heights; Michael G. White, Deerfield, both of Ill.

[73] Assignee: Zenith Electronics Corporation, Glenview, Ill.

[21] Appl. No.: 70,998

[22] Filed: Jul. 8, 1987

[51] Int. Cl.$^4$ ............................................. H01J 29/52
[52] U.S. Cl. ..................................... 315/381; 358/220
[58] Field of Search ......................... 315/381; 358/220

[56] References Cited

U.S. PATENT DOCUMENTS

| 4,217,525 | 8/1980 | Nakamura et al. | 315/381 |
| 4,275,338 | 6/1981 | Grocki et al. | 315/381 |
| 4,390,817 | 6/1983 | Johnson | 315/381 |

FOREIGN PATENT DOCUMENTS 1160002 12/1963 Fed. Rep. of Germany ...... 315/381

Primary Examiner—Theodore M. Blum

[57] ABSTRACT

A CRT phosphor burn protection arrangement has an RC delay circuit coupled between the power supply and the video amplifiers for maintaining B+ potential to the video amplifiers after turn off of the power supply. The video amplifiers drive the cathodes of the CRT. A capacitor is connected between the B+ terminal of the power supply and the common control grid of the CRT for driving the control grid in a negative direction upon turn off of the power supply. The combination of the CRT cathodes being maintained positive and the CRT control grid being driven more negative assures that the CRT is held in cutoff until potential phosphor burn producing energy in the CRT is dissipated.

5 Claims, 1 Drawing Sheet

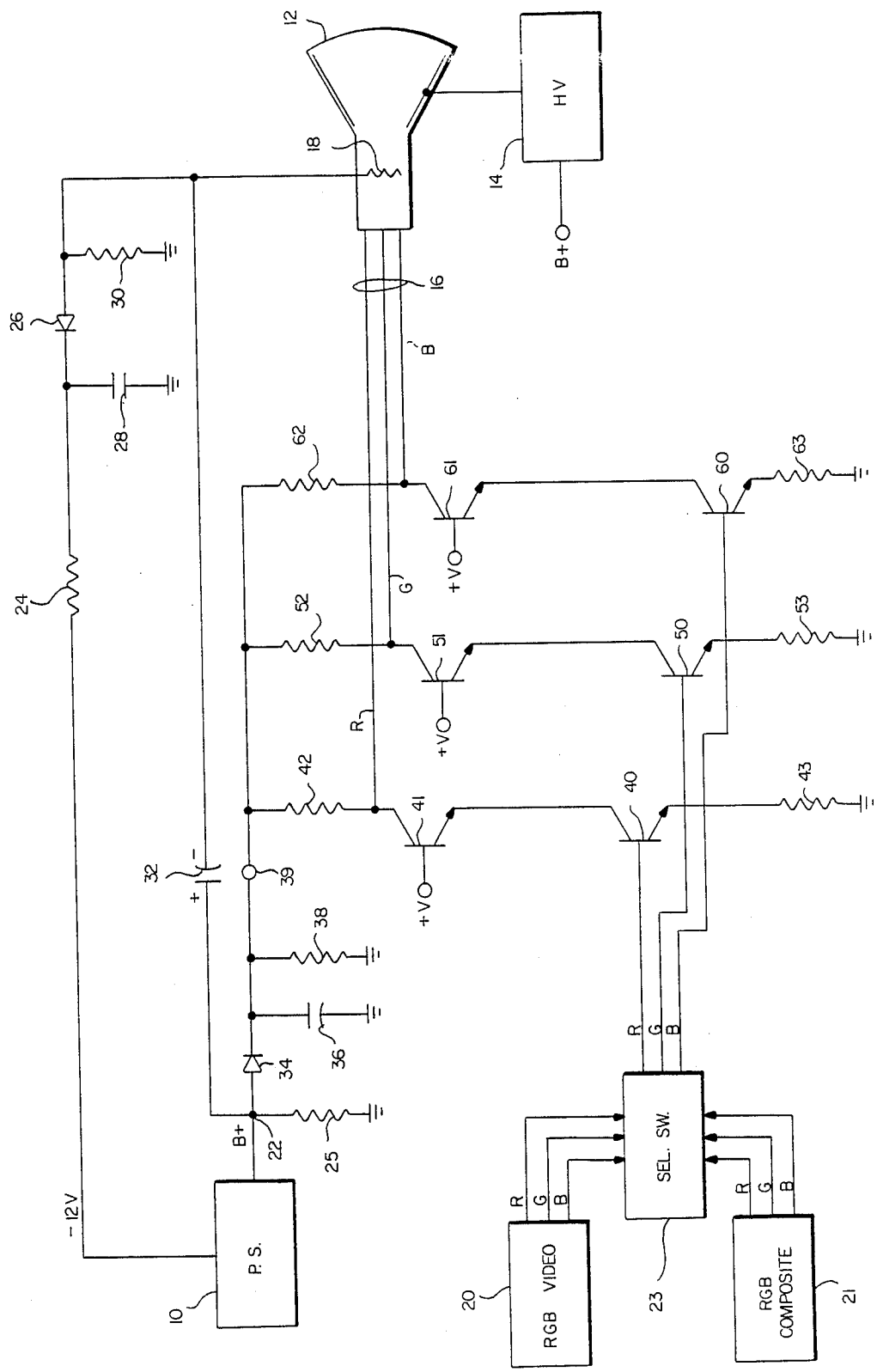

CRT PROTECTION CIRCUIT

BACKGROUND OF THE INVENTION AND PRIOR ART

This invention relates generally to CRT protection circuits and particularly to a circuit arrangement for preventing "burning" of the phosphor in the center of the cathode ray tube (CRT) faceplate.

The problem of phosphor burn due to an undeflected CRT electron beam impinging upon the phosphor screen is well-known in the CRT art. The difficulty arises when the beam deflection circuits are disabled while the video drive and high voltage circuits are still functional. In that event, the electron beam is no longer deflected over the phosphor target area but remains stationary and impinges upon a small freefall area in the central portion of the tube. The result is that the phosphor in that portion of the screen may be permanently damaged by the excessive energy dissipation. Two general approaches have been taken in the prior art to prevent the occurrence of phosphor burns upon turn-off of the apparatus that contains the CRT. One involves driving the CRT into heavy conduction while the deflection circuits are still active to assist in dissipating the high voltage energy stored by the large capacitance of the CRT. The other involves cutting off the CRT electron beam, and keeping it cut off, until the energy in the high voltage section has been dissipated to a safe level.

U.S. Pat. No. 4,275,338 discusses a number of prior art approaches including: maintaining residual operating voltage to permit continued functioning of the deflection circuits after turn-off of the CRT display; turning on the CRT electron beam more heavily to dissipate the stored high voltage energy prior to collapse of the beam deflection voltages; utilizing special logic circuits to completely blank the CRT electron beam upon sensing the absence of deflection voltage; and turning on a discharge transistor that is connected across the video output stage to drive the CRT into very heavy conduction upon turn-off of the display. That patent discloses a diode network coupled to the B+ supply of the video amplifier for charging a capacitor. When the power supply is turned off, the charged capacitor maintains the video amplifier operating voltage which keeps the cathode of the CRT positive with respect to the grid voltage. Thus, the CRT is held in cutoff for a time period after turn-off of the power supply.

U.S. Pat. No. 4,390,817 uses a bypass capacitor that is coupled to the control grid of the CRT. The circuit arrangement is such that negative cutoff potential is applied to the CRT control grid when the receiver is turned off.

U.S. Pat. No. 4,217,525 includes a transistor that is driven into cutoff when the receiver power supply is turned off. In so doing, the potential on the control grid of the CRT is elevated to drive the CRT into heavy conduction to discharge stored energy prior to collapse of the deflection system.

It will be appreciated that the high line video amplifiers in a monitor may be utilized with different low level video inputs, i.e., different signal inputs. For example, it is quite common to have a red, green and blue (RGB) video input as well as a composite R, G and B video input. The particular circuit arrangements in the sources determine whether the high level video output stage will be turned on hard or turned off when the main power supply is turned off. Also, with switch mode power supplies being extensively used, the sequence of voltage shutdowns when the power is turned off may result in situations where phosphor burn conditions may exist. A supplier of video monitors thus has a great interest in a circuit arrangement that effectively precludes the danger of phosphor burn upon turn-off of the monitor, irrespective of the type of video input that is connected to the monitor.

The circuit of the invention assures cutoff of the CRT, regardless of the type of low level video circuit that is coupled to the high level video circuit by both maintaining an operating potential on the high level video amplifier to keep the cathode of the CRT positively biased with respect to the control grid for a predetermined time after turn-off and by applying a negative voltage to the control grid of the CRT. This combination of a positive voltage applied to the cathode and a negative potential applied to the control grid assures that the CRT is driven into cutoff and held there for a sufficient time to preclude the danger of phosphor burn upon turn-off of the power supply.

OBJECTS OF THE INVENTION

A principal object of the invention is to provide a CRT having improved phosphor burn protection.

Another object of the invention is to provide a simple, economical phosphor burn protection circuit for a CRT.

BRIEF DESCRIPTION OF THE DRAWING

These and other objects and advantages of the invention will be apparent upon reading the following description in conjunction with the drawing, the single figure of which is a partial schematic diagram of a phosphor protection circuit constructed in accordance with the invention.

DESCRIPTION OF THE PREFERRED EMBODIMENT

A power supply 10 of known construction develops a plurality of different operating potentials, only two of which are indicated, a −12 volt potential and a B+ potential. A color CRT 12 is supplied with high voltage from a suitable source of high voltage 14 and includes three separate cathodes 16 and a common control grid 18. It will, of course, be recognized that the depiction of CRT 12 is schematic only and, in practice, other control grids and internal apparatus, such as a color selection electrode, are included in CRT 12. A source of RGB video 20 applies suitable R, G and B video signals to a selector switch 23. The outputs of selector switch 23 are coupled to the bases of three video amplifier transistors 40, 50 and 60, the emitters of which are connected to ground through resistors 43, 53 and 63, respectively, and the collectors of which are connected to respective ones of the emitters of three transistors 41, 51 and 61.

The collectors of transistors 41, 51 and 61 are connected through respective load resistors 42, 52 and 62 to a terminal 39. The collectors of the transistors are also respectively connected to the cathode of CRT 12 and their bases are connected to a +V bias source of voltage. Transistors 40 and 41, 50 and 51, and 60 and 61 are seen to be cascode connected amplifiers for supplying high level R, G and B video signals to CRT 12 from the low level RGB video input signals from selector switch 23.

A source of RGB composite video is also shown supplying R, G and B signals to selector switch 23. This representation typifies a video monitor that may be driven from different input signal sources. Switch 23 operates to couple only one source at a time to the high level RGB video amplifiers. It should be noted that the "turn-off" characteristics of sources 20 and 21 may be different, i.e., one may remove the RGB signals applied to selector switch 23 upon turn-off and the other may apply high level RGB signals upon turn-off. In this connection, it will be appreciated that the signal levels existing at, and for a few seconds after, turn-off of the monitor are of concern here. It will also be appreciated that the turn-off of the monitor may not result in turn-off of the RGB sources and therefore RGB signal voltages may remain at selector switch 23.

To summarize, upon turn-off of the monitor (power supply 10), the RGB voltages at the output of selector switch 23 may be high or low depending upon the inputs to the selector switch.

The B+ voltage from power supply 10 is present at a junction 22 and is connected to the anode of a diode 34, the cathode of which is connected to ground through the parallel combination of a filter capacitor 36 and a resistor 38. The cathode of diode 34 is also connected to terminal 39 for supplying operating potential for video amplifier transistors 41, 51 and 61 through the previously mentioned load resistors 42, 52 and 62, respectively. A resistor 25, representing other circuit elements (not shown), is connected between junction 22 and ground.

The −12 V line from power supply 10 is coupled through a resistor 24 to the cathode of a diode 26, the anode of which is connected to control grid 18 of CRT 12. The junction of resistor 24 and the cathode of diode 26 is connected to ground through a filter capacitor 28 and the anode of diode 26 is connected to ground through a resistor 30. Junction 22 is also connected through a capacitor 32 to control grid 18 in CRT 12.

In operation, the B+ potential developed at junction 22 results in capacitor 36 charging fully and the B+ potential is maintained for supplying load resistors 42, 52 and 62 of the video amplifier transistors. Under normal signal conditions, RGB video from selector switch 23 supplies suitable positive-going video signals to the bases of the video amplifier transistors 40, 50 and 60, which, with their cascode connected transistors 41, 51 and 61, are driven conductive to modify the biases existing between the respective ones of cathodes 16 and common control grid 18. The result is modulation of the intensity of the electron beams in CRT 12 in a well-known manner to make a color video display on the phosphor screen of the CRT. With the circuit of the invention, upon turn-off of power supply 10, the B+ potential at terminal 22 will fall rapidly. The positive potential, at the junction of diode 34 and capacitor 36, however, will persist for a time dependent upon the time constant of capacitor 36 and resistor 38.

It will be noted that either of two signal conditions may exist at the output of selector switch 23, i.e., RGB may be high or may be low. If they are low, transistors 40, 50 and 60 are driven into cutoff and therefore transistors 41, 51 and 61 are in cutoff. The voltage at their collectors goes toward B+ and CRT 12 is reverse biased, which is a safe state should the deflection system (not shown) collapse.

If the signals at the output of selector switch 23 are high, the transistors are in conduction and the voltages at the collectors of transistors 41, 51 and 61, in cooperation with the potential on grid 18, determine the conduction level of CRT 12. The charge stored in capacitor 36 helps maintain the potential at terminal 39 high to keep the collector voltages from falling which could place CRT 12 in a potential phosphor burn condition. Depending upon the timing of the B+ voltage decay and the dissipation of the high voltage energy and the collapse of the deflection system voltages, and the signals applied to the video amplifiers, the energy supplied by capacitor 36 may not keep the collector voltages sufficiently to protect the CRT.

Capacitor 32 is charged by virtue of its being connected between B+ and −12 volts. Upon turn-off, the B+ potential at terminal 22 rapidly falls and capacitor 32 begins to discharge through circuitry exemplified by resistor 25 and resistor 30. Control grid 18 is driven significantly more negative and held at a negative potential during the discharge cycle of capacitor 32. The increased negative potential on control grid 18, coupled with the sustained positive potential on cathodes 16, results in CRT 12 being driven far into cutoff and maintained in cutoff for a time period sufficient to enable decay and dissipation of the energy stored in CRT 12 under all practical delay times in deflection voltage collapse and high voltage dissipation encountered. When the tube comes out of cutoff, no significant energy remains, and the danger of phosphor burn of the CRT is eliminated.

The combination of maintaining the cathodes of the CRT at a positive potential and driving the control grid more negative results in the cutoff of CRT 12 under a "worst case scenario" being controlled to assure that the energy in the CRT has been dissipated.

What is claimed is:

1. In combination:
   a CRT having a cathode and a control grid;
   means for negatively biasing said control grid with respect to said cathode;
   video amplifier means for driving said cathode with a video signal;
   a DC power supply;
   first means coupled between said DC power supply and said video amplifier means for maintaining operating potential for said video amplifier means for a period after turn-off of said power supply; and
   second means for driving said control grid more negative with respect to said cathode upon turn-off of said power supply.

2. The combination of claim 1 wherein said first means comprises an RC circuit.

3. The combination of claim 2 wherein said second means comprises a capacitor coupled between said DC power supply and said control grid.

4. The combination of claim 3 wherein a diode is connected between said DC power supply and said RC circuit.

5. In combination:
   a CRT having a cathode and a control grid;
   means including a diode connected to said control grid for negatively biasing said control grid with respect to said cathode;
   a video amplifier for driving said cathode with video signals;
   a B+ power supply;
   delay means including a diode and an RC circuit coupled between said B+ power supply and said video amplifier for maintaining operating potential on said video amplifier after turn-off of said power supply; and a capacitor coupled between said B+ power supply and the junction of said diode and said control grid for driving said control grid in a negative direction with respect to said cathode upon turn-off of said power supply.

* * * * *